US011875960B2

(12) United States Patent
Lorenz et al.

(10) Patent No.: US 11,875,960 B2

(45) Date of Patent: Jan. 16, 2024

(54) ELECTRICAL FUSE DEVICE, METHOD OF MANUFACTURING A FUSE DEVICE AND A METHOD OF OPERATING AN ELECTRICAL FUSE DEVICE

(71) Applicant: Auto-Kabel Management GmbH, Hausen i.W. (DE)

(72) Inventors: Thomas Lorenz, Velbert (DE); Jürgen Große, Mönchengladbach (DE); David Cacciatore, Kempen (DE)

(73) Assignee: Auto-Kabel Management GmbH, Hausen i.W. (DE)

( * ) Notice: Subject to any disclaimer, the term of this patent is extended or adjusted under 35 U.S.C. 154(b) by 0 days.

(21) Appl. No.: 17/921,881

(22) PCT Filed: Mar. 17, 2021

(86) PCT No.: PCT/EP2021/056781

§ 371 (c)(1),
(2) Date: Oct. 27, 2022

(87) PCT Pub. No.: WO2021/219286

PCT Pub. Date: Nov. 4, 2021

(65) Prior Publication Data

US 2023/0120705 A1 Apr. 20, 2023
US 2023/0290595 A9 Sep. 14, 2023

(30) Foreign Application Priority Data

Apr. 30, 2020 (DE) ..................... 10 2020 111 765.5

(51) Int. Cl.
*H01H 1/36* (2006.01)
*H01H 39/00* (2006.01)

(52) U.S. Cl.
CPC .......... *H01H 39/006* (2013.01); *H01H 1/365* (2013.01); *H01H 39/004* (2013.01); *H01H 2039/008* (2013.01)

(58) Field of Classification Search
CPC .... H01H 1/365; H01H 39/006; H01H 39/004; H01H 2039/008; H01H 9/106;
(Continued)

(56) References Cited

U.S. PATENT DOCUMENTS 4,480,014 A * 10/1984 Milligan ................ H01H 1/023
420/512
5,783,987 A * 7/1998 Kern ...................... H01H 39/00
337/403

(Continued)

FOREIGN PATENT DOCUMENTS

AT 521539 A1 2/2020
DE 19712387 A1 10/1997

(Continued)

OTHER PUBLICATIONS

German Patent Office, Office Action issued in German priority application, Application No. 10 2020 111 765.5, dated Nov. 24, 2020, 9 pages.

(Continued)

*Primary Examiner* — William A Bolton
(74) *Attorney, Agent, or Firm* — Sunstein LLP

(57) ABSTRACT

A fuse device comprising a housing, at least two connection lugs, a connecting element between the connection lugs, and an actuator. The actuator moves the connecting element from a closed position, in which it connects the connection lugs, to an open position, in which it is disconnected from at least one of the connection tabs. A particularly well-conducting connection between the connection lugs and the connecting element, which can nevertheless be easily dis-
(Continued)

connected by the actuator, is achieved by the connecting element being interference-fitted between the connection lugs.

22 Claims, 14 Drawing Sheets

(58) Field of Classification Search
CPC ......... H01H 2009/108; H01H 85/0241; H01H 85/38; H01H 1/06; H01H 1/021; H01H 1/025; H01H 1/023; H01H 39/00; H01H 2001/0025
USPC ......... 200/52 R, 50.07; 218/95; 337/17, 142, 337/157, 158, 171, 401, 404, 405, 412, 337/416
See application file for complete search history.

(56) References Cited

U.S. PATENT DOCUMENTS

| | | | | |
|---|---|---|---|---|
| 7,239,225 | B2 * | 7/2007 | Tirmizi | H01H 39/006 337/30 |
| 8,432,246 | B2 * | 4/2013 | Suzuki | B60L 3/0007 361/115 |
| 9,236,208 | B2 * | 1/2016 | Ukon | H01H 39/006 |
| 9,953,783 | B2 * | 4/2018 | Fellmer | H01H 39/006 |
| 10,211,014 | B2 * | 2/2019 | Kim | H01H 85/0241 |
| 10,388,481 | B2 * | 8/2019 | Lell | H01H 85/18 |
| 10,418,212 | B2 * | 9/2019 | Warenits | H01H 9/32 |
| 2019/0184834 | A1 * | 6/2019 | Hammerschmidt | H01H 39/00 |
| 2019/0244778 | A1 * | 8/2019 | Dariavach | H01H 39/006 |

FOREIGN PATENT DOCUMENTS

| | | | |
|---|---|---|---|
| DE | 102010011150 | A1 | 9/2011 |
| DE | 102015107579 | B3 | 8/2016 |
| EP | 0690466 | A1 | 1/1996 |
| GB | 2577346 | A | 3/2020 |
| WO | 9741582 | A1 | 11/1997 |

OTHER PUBLICATIONS

ISA/European Patent Office, International Search Report and Written Opinion of the International Searching Authority, Application No. PCT/EP2021/056781, dated Jun. 11, 2021, 10 pages (with English translation of the International Search Report).

* cited by examiner 1
10
11
12
13
16a
16b
17
21a
21b
22a
22b
21a,21b
22a,22b
23
24
26
Ic
X
Y
Z

ELECTRICAL FUSE DEVICE, METHOD OF MANUFACTURING A FUSE DEVICE AND A METHOD OF OPERATING AN ELECTRICAL FUSE DEVICE

CROSS-REFERENCE TO RELATED APPLICATIONS

This application is the national phase entry of international patent application no. PCT/EP2021/056781 filed Mar. 17, 2021 and claims the benefit of German patent application No. 10 2020 111 765.5 filed Apr. 30, 2020, the disclosures of which are incorporated herein by reference in their entirety.

TECHNICAL FIELD

The subject matter relates to an electrical fuse device, a method for manufacturing a fuse device and a method for operating an electrical fuse device.

BACKGROUND ART

In the course of the progressing electrification, increasingly high powers have to be transferred in motor vehicles (KFZ) between energy sources (generators and storage devices) and consumers, in particular between the battery and the drive. This is usually done via electrical cables and preferably high electrical voltages are used to keep the ohmic losses of the energy transfer low. The voltages used are often far above the common 12V or 24V so far used in the electric vehicle supply network and sometimes reach several hundred volts. The risks of these life-threatening voltages must be kept low for vehicle occupants, pedestrians and rescue workers by means of appropriate safety technology.

In particular, it must be possible to quickly and permanently disconnect the connection between voltage sources and the vehicle's internal distribution network. To this end, fuse devices have been used in the past, often involving a gas or pyrotechnically powered actuator and either a conductor with a tapered breaking point or two conductors connected by a connecting element. Such a actuator can quickly, on time scales of a few milliseconds, initiate motion and, in conjunction with the conductive elements prepared for the purpose, cause electrical separation. In the first of said conductive elements, the actuator breaks the conductor at its predetermined breaking point, and in the second, the contact between the connecting element and at least one conductor is separated by the actuator.

If a single conductor is used, there is the problem that the taper often introduced for the predetermined breaking point reduces the cross-section and thus increases the electrical resistance. Furthermore, high forces are required to break through and bend the conductor materials to ensure separation. In addition, the elastic restoring forces of the conductor can move it back towards its original position and lead to an undesired restoration of the electrical connection.

When using a connecting element between conductors, the contact between the connector and the conductors was usually secured by the elastic restoring force of the connecting element alone. As a result, the contact resistance between the different parts often remained high, since no large-area electrical contact could be achieved. As a further difficulty, permanent separation of the conductors could often not be guaranteed with absolute certainty, since no device prevented renewed contact between the connecting element and the conductors.

Therefore, the subject matter was based on the object of providing an electrical fuse device of low ohmic resistance, which can be separated quickly and permanently.

SUMMARY OF THE INVENTION

It has been recognized that an interference fit of two metal components can significantly reduce the electrical contact resistance between the metal components compared to a clearance fit. At the same time, the metal parts can still be released from each other by applying moderate force.

In particular in motor vehicles, nowadays compact fuse devices are necessary that can reliably and permanently disconnect sources of high electrical voltage from the rest of the vehicle electrical system quickly, i.e. in the millisecond range. It is important for the efficiency of energy transmission that such a fuse device has a low electrical resistance so that the ohmic losses are low.

All the following descriptions of shapes by means of terms commonly used in geometry, such as spherical, cylindrical, conical, etc., are not to be understood in a strict mathematical sense, but as approximations to these theoretical shapes.

According to the subject matter, it is proposed that an electrical fuse device comprises a housing. The housing may be closed or partially closed. It may comprise straight walls and be of rectangular construction, with parallel walls opposing one another, respectively, and substantially rectangular cross-sections of the housing, or it may comprise partially curved walls or walls otherwise shaped to deviate from a straight surface. It is also possible for the housing to have at least a circular cross-section, in particular a cylindrical shape with a substantially circular or elliptical cross-section, or to be substantially spherical in shape.

The housing is preferably formed at least partially of an electrically non-conductive material, for example plastic, ceramic or similar materials. By means of the housing, the elements of the fuse device that guide voltages are protected and there is no risk of accidental contact with a conducting other component, which could result in a risk, for example, to the vehicle occupants. In addition, all fuse-related processes are protected from mechanical, other electrical or other influences, as well as from moisture, so that functionality is guaranteed over a long period of time. It is possible to keep the housing airtight, in particular to seal all entrances and any joining seams, and/or to fill it with a gas to further increase the durability of the enclosed components.

At least two connection lugs are routed into the housing. Also, multiple pairs of connection lugs may be routed into the housing. Recesses are provided in the housing walls through which the connection lugs may be inserted. The connection lugs may be guided into the housing from opposite sides, or from the same side, or from sides substantially perpendicular to each other, or from any other sides. Each of the recesses in the housing provided for the connection lugs may be larger in at least one direction of expansion of the recess than the expansion of the cross-section of the respective connection lug in the respective direction of expansion, or may be substantially flush with the side surfaces of the respective connection lug.

It is also possible for a seal to extend along the edge of the opening and encompass the connection lug in the inserted state. In this case, the seal can be formed from plastic, silicone, rubber, or another material that is preferably non-conductive. The insertion of the connection lugs into the housing, in particular the precisely fitting enclosure of the connection lugs from the sides of the recess in the housing wall, ensures that the connection lugs have an outer part outside the housing and an inner part inside the housing.

The inner portion is protected by the housing from influences such as moisture, corrosive gases, high temperatures, and other influences, and the inner portion of the connection lug can thus be optimized solely for functioning within the housing without, for example, having to minimize the area of uninsulated regions or having to apply a protective coating.

For example, the outer portion may be insulated and/or otherwise coated and/or provided with terminals for contacting with other circuit elements.

The connection lugs are preferably held in a fixedly defined position by the housing, even when force is applied to the connection lugs. For this purpose, it may be advantageous to provide fastening means, in particular to provide a strain relief on the connection lugs in the area of the feed-through into the housing, for example to taper the connection lugs, to make recesses in the connection lug, to form projections in the connection lugs or to provide similar elements for fastening. The housing may include suitable elements to engage with these fastening means on the connection lug. For example, the opening itself may engage with recesses on the connection lug, and the opening cross-section may have projections for this purpose. One or more projections and gripping elements may be arranged around the opening. Recesses may be provided in which elements arranged on the connection lugs can engage. Other fastening means may also be provided on the housing. Fixing the connection lugs to the housing ensures that mechanical influences on the connection lugs, for example during assembly, do not cause damage to the fuse device and that the connection lugs are held in a constant position when force is applied to actuate the fuse device.

The connection lugs are made of a conductive material, preferably a metal material, in particular copper or a copper alloy or aluminum or an aluminum alloy. The conductors may be at least partially coated with a second material, in particular a metal material. The connection lugs may be flat conductors having a substantially rectangular cross-section, or round conductors having a substantially round cross-section. The connection lugs may have a substantially constant cross-section or may have tapers and broadenings. In particular, it is possible that the connection tabs may be widened at their ends inside the housing and have planar regions.

The connection lugs comprise side surfaces that define the boundary between the conductor material and the conductor environment. The side surfaces may be flat, concave, convex, cylindrical, tubular, spherical, and/or otherwise shaped. The connection lugs may be formed from a solid material or may be formed as a stranded conductor. The connection lugs may at least partially have an insulation layer on the outer portion and partially on the inner portion, and may be at least partially stripped of insulation on the inner portion. The connection lugs allow current to be conducted into and out of the housing of the fuse device.

Two connection lugs inserted into the housing are respectively spaced apart by a gap. The gap extends from one or more side surface(s) of a first connection lug to one or more side surface(s) of a second connection lug. For each connection lug, a gap surface can be defined which is a conductive side surface adjacent to the gap. The direction of extension of the gap runs between the gap surfaces of two connection lugs. The gap surface of each connection lug can be at least partially flat shaped, at least partially concave or convex shaped, and/or divided into several sectionally flat and/or concave and/or convex subplanes, in particular subplanes can be semi-tubular, cylindrical, spherical shaped. A volume of the gap spans between the subplanes, which can be defined by sectional cross sections. The gap cross-section may be constant along at least one spatial direction. It is also possible that the cross-section changes along at least one spatial direction, in particular that the cross-section tapers along a direction, in particular decreases monotonically along a spatial direction. Preferably, the distance of each point of the circumferential line of the cross-section to the geometric center of gravity of the surface essentially decreases along at least one spatial direction in this case. The cross-section may also be constant in sections along at least one spatial direction and decrease in area in sections.

The gap may span between the two end faces respectively at the end of one of two connection lugs, or between longitudinal faces (along longitudinally extending surfaces of the connection lug) of a connection lug respectively, or between a longitudinal face of a first connection lug and an end face of a second connection lug.

The gap ensures electrical insulation of the two connection lugs. As long as the gap contains only the gas filling the housing, no current can flow between the two connection lugs. The width of the gap, the gas contained in the housing and other factors such as temperature determine the breakdown voltage above which an arc and thus an electrical connection is created. Larger gap widths result in a higher dielectric strength of the fuse device. In the case of a constant cross-section along a spatial direction, the connection lugs can act as a guide for an element located in the gap in this spatial direction, a tapering gap facilitates the movement of an element in the gap in a preferred direction and allows the connecting element to be separated after a short distance.

Furthermore, the fuse device comprises a connecting element. The connecting element is at least partially made of an electrically conductive material, preferably a metal material, in particular copper or a copper alloy or aluminum or an aluminum alloy. The connecting element may have an at least partially rectangular cross-section and/or a round or elliptical cross-section or an otherwise shaped cross-section.

Preferably, the connecting element comprises two at least partially and/or sectionally flat side surfaces, in particular two flat side surfaces arranged on opposite sides of the connecting element and/or parallel to each other. Also, one, two or more side surfaces may be concavely or convexly curved. Preferably, the connecting element has a constant cross-section along at least one axis. In an alternative embodiment, the connecting element has a cross-sectional area that monotonically decreases along at least one spatial direction. In particular, the distance between any point on the contour of the cross-section and the geometric center of gravity of the cross-section may decrease monotonically along a spatial direction. The cross-sectional area may also be constant in sections and decrease in sections.

In the installed state, the so-called closed position, the connecting element is arranged in the gap between the two connection lugs and is in mechanical contact with the connection lugs at its contact surfaces. The connecting element thus preferably fits into the gap with essentially no clearance. Before fitting into the gap, it may be larger than the gap. Preferably, the contact surfaces are at least partially arranged in the area of the gap surfaces of the connection lugs. The connecting element establishes the electrical contact between the two connection lugs. For this purpose, it is advantageous if the contact surfaces are as large as possible in order to reduce contact resistance. Compared to a single, continuous conductor instead of two connection lugs and a connecting element, the solution according to the subject-matter has the advantage that the connecting element can be released from the gap with less force compared to the force required to break through a connection lug.

An actuator is provided in the housing of the fuse device. This may comprise an electrically or otherwise powered motor, pneumatic, hydraulic, piezoelectric, gas powered, or pyrotechnic actuator, for example a ignition pill.

The actuator may be located in a recess of the housing and/or attached to the inner wall of the housing, for example, glued, screwed, riveted, snap-fitted, or otherwise secured.

The actuator is adapted to exert a force on at least the connecting element when triggered, and to disengage the connecting element from the closed position in which it electrically connects the connection lugs, and to move it to an open position in which the connection lugs are no longer electrically connected to one another.

The connecting element may be electrically disconnected from one or both of the connection tabs in the open position. The connection lugs remain substantially in position and are substantially unmoved by operation of the actuator. It is also possible for the connection lugs to be moved and/or bent and/or broken by the actuator.

A clearance may be provided in the housing for the connecting element to be moved into by the actuator. By dimensioning the clearance, the freedom of movement of the connecting element in the clearance, i.e. in the so-called open position, can be restricted. In particular, the height in the direction of movement of the actuator can be only slightly greater than the height of the connecting element and/or the width of the free space can be only slightly greater than the width of the connecting element.

The actuator enables the controlled separation of the connection between the connecting element and the connection lugs by disengaging the connecting element from the gap between the two connection lugs. It enables the fuse device to be triggered by a control signal and to perform its separating action safely, inside the housing.

In particular, a pyrotechnic element, for example an ignition pellet, can be used as the actuator. This type of actuator can develop a high force effect, particularly in the short term, and is inexpensive. It allows the fuse device to be actuated once and is thus well suited for a one-time, irreversible disconnection.

If the connecting element were only loosely inserted between the connection lugs in a clearance fit, electrical contact would be there. However, the transfer resistances between the connection lugs and the connecting element would be large and the connection would be susceptible to mechanical influences. It is therefore proposed that the connecting element is pressed in an interference fit between the two connection lugs. For this purpose, the connecting element is sized equal to or larger than the gap enclosed by the two connection lugs in the direction in which the gap extends before pressing. Hydraulic, pneumatic, hydrostatic, motor-driven or other presses with high pressing pressures can be used for pressing. This ensures that the conductive surfaces of the connecting element and the respective connection lug make contact over a large area. The advantage of such an interference fit over a loose clearance fit, in which the connecting element is only inserted between the connection lugs, is that on the one hand a low contact resistance is achieved, but on the other hand the mechanical connection can be released again without being destroyed, unlike in the case of welding, for example.

A further advantage of the interference fit is that after the connecting element is moved out of the gap, it deforms elastically and expands again, particularly in the spatial direction in which the gap extends. As a result of the removal of the contact pressure of the contact surfaces on the connecting element, the latter can deform elastically, in particular expand. This expansion means that the connecting element can no longer slip back into the gap when the driving force is removed and the connecting element springs back. This prevents re-contacting after the fuse device has been triggered.

The non-destructive, detachable low-resistance connection between the connecting element and the connection lug thus made possible allows the actuator to release the connecting element from the gap between the two connection lugs. Since lower forces are required than, for example, when a conductor is broken, the actuator can be relatively small in size and the fuse device remains light and inexpensive. The connecting element slides into a cavity in the housing and remains there. The housing protects the environment from the mechanical force of the actuator as well as from any loose fragments, tinsel and/or waste products resulting from operation of the actuator and disconnection of the connecting element from the connection lugs. The housing further ensures that the actuator can transmit its mechanical force to the connecting element and that the connection lugs meanwhile remain substantially immobile relative to the actuator, in particular this can be ensured by the fastening means connecting the connection lugs to the housing wall.

The two end faces of the two connection lugs can be flat and aligned parallel to each other, also the end faces can be concave or convexly curved, and/or jagged, preferably in such a way that the cross-sectional area of the gap enclosed by the faces is substantially constant along a spatial direction and/or tapers monotonically at least in sections along a spatial direction. Also, the connecting element may be substantially hemispherical and/or cylindrical and/or conical at least in sections. By having a substantially constant cross-section, the connection lugs can act as a guide for the connecting element. This can be moved by the actuator and slide along the gap surfaces of the connection lugs until it has completely left the gap. In particular, a concave shape of the gap surfaces of the connection lugs and a convex shape of the connecting element surfaces can help move the connecting element along a fixed straight trajectory. A taper of the gap and connecting element can speed up separation because a smaller displacement distance of the connecting element is sufficient for separation from the connection lugs compared to a constant cross-section where the entire height of the connecting element must be overcome in the direction of movement. Also, a taper provides a preferred direction of displacement and eliminates the need to overcome frictional resistance over larger displacement distances. A hemispherical and/or round shape of the connecting element can ensure separation even when the connecting element is twisted.

According to an embodiment, at least one connection lug comprises an end face. Also, a plurality of connection lugs may comprise end faces. The end faces of two connection lugs can face each other in the housing. In an embodiment, the connecting element can be arranged between two end faces facing each other, preferably in a precisely fitting manner.

According to an embodiment, at least one connection lug comprises a longitudinal surface extending laterally along the longitudinal direction of the connection lug. Also, a plurality of connection lugs may have longitudinal surfaces. The longitudinal surfaces may be gap surfaces, such that the gap spans between the longitudinal surfaces. The connection lug may be an interference fit between the longitudinal surfaces. In particular, the contact surface may be a wide longitudinal surface. By contacting the connecting element with the longitudinal surfaces, the contact area can be large and the electrical contact resistance can thus be lower. In particular, the contact area may be larger than the cross-sectional area of the conductor.

According to one embodiment, the surface of the contact area deviates from a smooth surface structure and has a beveled, curved or staircase-shaped surface, or a sectional combination of these different textures. Compared to a flat contact surface of the conductor, the contact area is thus increased.

According to an embodiment, the connecting element and/or the connection lugs may be at least partially coated. In particular, the elements can be coated in the area of the contact surface between the connecting element and the connection lug. The coating is preferably formed of a conductive material, preferably a metal material, which is preferably different from the other material of the connecting element and/or the connection lug. A possible coating material is tin and/or nickel, alternatively aluminum, copper or other materials can be used. The coating results in a change in the surface properties, which can favor the connection between the connection lug and the connecting element.

In particular, it is advantageous if the material of the coating has a lower material hardness, for example a lower Rockwell hardness, than the main component of the connection lugs and the connecting element. This allows the surfaces of the connecting element and/or connection lug to deform plastically during pressing, unevenness is compensated and interlocking of the surfaces can be achieved. Overall, this favors large-area contacting. Due to the fact that the remaining material of the connection lugs and the connecting element has a higher hardness and thus lower deformability, the pressing pressures can be transmitted without major plastic deformation and only local plastic deformation occurs in the area of the contact surfaces, which is advantageous for minimizing electrical resistance.

According to one embodiment of the solution according to the subject matter, the connecting element and/or at least one of the connection lugs is formed from a metal material, in particular from copper or a copper alloy or from aluminum or an aluminum alloy. A metal material can withstand the pressures of compression while providing high conductivity.

According to one embodiment, at least one of the connection lugs is formed from an electrically conductive flat part, in particular a sheet or strip. Where reference is made hereinafter to sheet metal, this always includes one or more electrically conductive flat elements. The connection lug may comprise a single, optionally formed flat part, or several flat parts. In particular, it may be advantageous if the contact surface and/or gap surface of the connection lug is a longitudinal surface of the flat part, in particular a wide longitudinal surface. For this purpose, the flat part of the connection lug can be bent after insertion into the housing if the connection lugs are inserted into the housing from opposite sides. It is also advantageous if the connection lugs are in contact with the housing wall in order to be supported by the housing in the event of any forces acting on them. By contacting the large-area longitudinal surfaces, the contact resistance can be kept low.

According to one embodiment, the connecting element is at least partially formed from flat part. A single flat part, optionally formed into a more complex shape, may be used, or multiple connected flat parts may be used. For example, in the region of at least one contact surface, the connecting element may have a large-area region for contacting the respective connection lug. The areas of the contact surfaces can be electrically and/or mechanically connected via a further flat part. For example, the connecting element can comprise three flat parts assembled to form an H element. It is also possible to combine flat parts with one or more elements made of solid material. Preferably, the elements of the connecting element may be made of a metal material, in particular copper or a copper alloy or aluminum and an aluminum alloy. By using flat parts, the amount of conductive material used and thus the weight and cost can be reduced. At the same time, the contact area can be kept large and thus the electrical contact resistance between the connection lug and the connecting element can be kept small.

According to one embodiment, the connecting element may comprise a flat part or a contact piece partially formed as a flat part as a first element and a second support element. The support element may preferably be made of a non-conductive material, such as plastic, rubber, synthetic resin, or other materials. The support element may also comprise a conductive material. The support element may be in mechanical contact with at least one of the connection lugs. However, it is also possible that the support element does not contact the connection lugs. The contact piece may wrap around the support element on at least three sides.

In the closed position, the contact piece is in mechanical and electrical contact with both connection lugs. It electrically connects the two connection lugs. The support element ensures the mechanical connection between the connecting element and the connection lugs in the area of the contact surfaces and at least partially absorbs the force of the pressing. For example, the contact piece can comprise two flat parts in the area of the contact surfaces of the connection lugs and a conductor that connects the two flat parts.

The support element may be located between the two flat parts of the contact piece. Also, the contact piece may be formed from a single flat part, for example, in a U-shape or a pot-shape around the support element. It is further possible for the support element to fill multiple, possibly unconnected, spaces within a contact piece formed from multiple flat parts, for example spaces of an H-shaped sheet composite of the contact piece.

Both the contact piece and the support element are swaged together as a connected connecting element between connection tabs. The use of a support element in the connecting element enables the pressures acting on the connecting element during pressing to be at least partially absorbed by the support element. In this way, less metal can be used than in the case of a connecting element made of solid material, which, thanks to the support element, no longer fulfills any mechanical support function, and the manufacture of the fuse device becomes less expensive.

Due to the interference fit, the connecting element is longer in the direction of the gap between the connection lugs before pressing than after pressing. Due to the elasticity of the materials of the connecting element, either the solid material, the flat part, the material of the support element and/or any other components of the connecting element, the connecting element increases in size after it is released by the actuator. Thus, in the open position, the connecting element does not fit into the gap between the connection lugs.

It has been recognized that this elastic expansion of the material can be used to achieve irreversible, permanent separation of the connection lugs and the connecting element To exploit this possibility, according to one embodiment, it is proposed that insulators are arranged on at least one connection lug on the side facing away from the actuator, into which the connection piece is moved when it is released from the gap by the actuator. These insulators may be part of the insulation coating of the connection lug and/or may be parts of the housing as projections. The respective insulator can be at least partially flush with the gap surface of the respective connection lug and/or at least partially project beyond the gap surface towards the gap center. The insulator or insulators, in conjunction with the expansion of the connecting element after release from the closed position and movement to the open position, ensure that the connecting element cannot come back into contact with either connection lug.

Preferably, the insulator is made of a elastic non-conductive material, such as silicone, rubber, plastic, or one or more other materials. The insulator may have a rectangular, circular, or other cross-section and/or be beveled toward the gap to reduce mechanical resistance as the connecting element passes. It is also possible that the insulators are snap elements that can be deflected by a folding mechanism through the connecting element and snap back to their original position after passing the connecting element to prevent the connecting element from slipping back.

According to one embodiment, guides are provided along which the connecting element can move. The guides may penetrate the connecting element and/or be provided on the housing and/or on the connection lugs. The guides may comprise rails, tubes, ropes or similar devices extending in the drive direction and are preferably made of a non-conductive material. The guide elements, in particular rails, can be arranged on the inner wall of the housing. The guide restricts the freedom of movement of the connecting element, which can thus move substantially along a straight line. It can thus be prevented that the connecting element approaches the connection lugs, in particular in the open position.

According to one embodiment, multiple pairs of connection lugs may be inserted into the housing and may be connected in pairs respectively by a respective connection element to a respective fuse conductor. An actuator for all fuse conductors may be provided that disconnects all fuse conductors substantially simultaneously. It is also possible for each fuse conductor to have its own actuator and for the connecting elements of each fuse conductor to be independently tripped. It is also possible for a subset of the fuse conductors to be actuated together by one actuator and another subset to be actuated separately by a respective actuator.

In the case of separate actuators, it may be advantageous to provide additional housing walls dividing the housing of the fuse device into chambers. Each chamber may contain a actuator, one or more fuse conductors, and other elements, including the insulators. By integrating multiple fuse conductors into a fuse device, a multi-phase, for example three-phase, connection can be fused with one element and all phases can be disconnected separately or simultaneously. Also, multiple energy storage devices and/or generators that jointly feed power into the distribution grid can be disconnected simultaneously. Separation in chambers enables separate separation of the individual fuse conductors and also ensures that waste products such as splinters, dust and soot produced during separation do not enter the area of the other fuse conductors and possibly impede separation there.

Due to the abrupt movement of the connecting element in a confined space, high pressures can occur inside the housing for a short time, especially in the free space into which the connecting element moves. To ensure that this pressure does not impede the movement of the connecting element and/or even trigger an opposite movement, it can be advantageous to allow the gas present in the housing to escape. To this end, according to one embodiment, it is proposed to arrange venting means in the area of the housing into which the connecting element is moved by the actuator. These may be a valve, a hole, a seal to be penetrated by the pressure, or similar devices. The venting device allows the gas in the housing to leave the housing when compressed by the movement of the connecting element. This thus does not impede the separation process and safe separation is ensured.

In the case of actuators based on pressure, such as a pyrotechnic or a gas-powered actuator, it is important that the pressure between the actuator and the connecting element can build up inside the housing and be maintained for at least a short time. The pressure forces the connecting element out of the closed position. For this purpose, it is crucial that the part of the housing in which the actuator is housed, the actuator chamber, is isolated in an airtight manner. To this end, one embodiment provides for arranging insulation around the fuse conductor comprising connection lugs and connecting element, filling the space between the fuse conductor and the housing wall. In this regard, the seal should not impede movement of the connecting element when it is disengaged from the gap. In addition, seals can be provided at openings in the housing, in particular for the connection lugs and/or joining seams of the housing. Preferably, the seal can be formed of an elastic non-conductive material such as silicone, rubber, soft plastic or similar materials. Thus, no or little gas can escape past the fuse conductor from the drive chamber except by disengaging the connecting element from the gap between the connection lugs.

To fabricate a fuse device according to the subject matter, first a connecting element is fabricated. A connecting element made of solid material may be made by casting, cutting, stamping, forging, or similar processing steps. In the case of a connecting element made of sheet metal parts, each individual sheet metal element can be produced, for example, by rolling and then be formed, for example, by deep drawing. For example, the support element may be cast, injection molded, cut out, and then connected to the contact piece made of sheet metal elements. It is also possible to cast or injection-mold the support element in and/or around a contact piece.

Before contacting with the connection lugs, the contact surfaces of the connecting element and/or connection lugs can be coated. This can be done, for example, by electroplating, tinning, hot dipping or other processes. An existing coating can also be removed from the connection lugs and/or a coating can be applied in the area of the insulation to ensure electrical separation of the connecting element and connection lugs in the open position.

The connection lugs and the connecting element are then pressed together under high pressures by means of a mechanical pressing process. For example, a hydraulic, pneumatic, hydrostatic, motor-driven or other pressing technique can be used here. The housing is then fitted with fuse conductor, actuator and, if necessary, other elements such as insulators, seals, etc. It is also possible to insert the connection lugs and the connecting element into the housing first and only then press them inside the housing.

To use the fuse device, the connecting element of the fuse device is initially in the closed position. Current can flow through the fuse conductor. By actuating the actuator, a force is now applied to the connecting element, releasing it from the closed position and moving it to the open position. Due to the elastic expansion of the connecting element, it remains in the open position and cannot move back to the closed position. The insulators ensure permanent electrical isolation of the connecting element with at least one connection lug.

BRIEF DESCRIPTION OF THE DRAWINGS

In the following, the subject matter is explained in more detail with reference to a drawing showing embodiment examples. The drawings show.

DETAILED DESCRIPTION OF SPECIFIC EMBODIMENTS

Figures 1A, 1B, 1C:
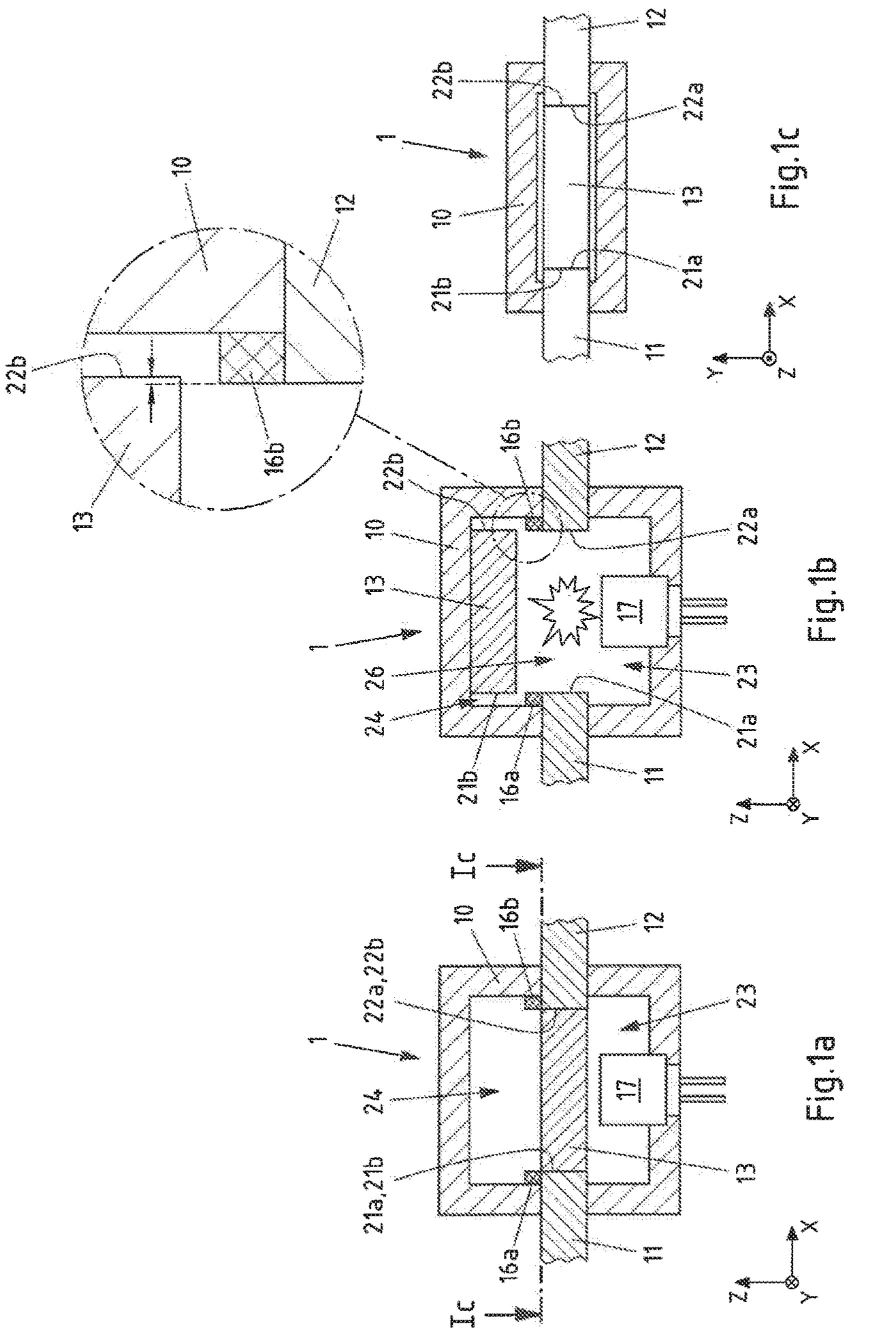
FIG. 1 *a-c* an embodiment of a fuse device according to the subject matter with connection lugs and connecting element made of solid material.

FIG. 1 shows a fuse device 1, which comprises a housing 10, a first connection lug 11 and a second connection lug 12. The housing 10 protects the fuse device 1 from external influences. The housing 10 can further serve as a holder for the connection lugs 11 and 12, as well as other elements of the fuse device 1.

The two connection lugs 11, 12 are connected by a connecting element 13. For this purpose, the connecting element 13 is arranged between the two connection lugs 11, 12 in the gap 26 and is in mechanical and electrical contact with the connection lugs 11, 12 at contact surfaces 21*b* and 22*b*. The connection lugs 11, 12 in turn contact connecting element 13 at contact surfaces 21*a*, 22*a*. In the configuration shown in FIG. 1, connecting element 13 is arranged between the end faces of connection lugs 11, 12.

On one side of the connecting element 13, an actuator 17 is located in the housing 10. The actuator 17 can be arranged in a recess of the housing 10 and/or attached to the inner wall of the housing 10, for example glued, screwed, riveted, or otherwise fastened.

On the side of the housing 10 in which the actuator 17 is located, a cavity is provided, the drive chamber 23. On the side of the housing 10 facing away from the actuator 17, a second cavity 24 is provided.

On the side of the second cavity 24 of the housing 10, i.e. facing away from the actuator 17, insulators 16 (16*a* and 16*b* in FIG. 1) are provided at the connection lugs 11, 12. The insulators 16 can be part of an insulation applied to the connection lugs 11, 12 and/or can be part of the housing 10 in the form of, for example, projections.

FIG. 1*b* shows an exemplary actuation of the fuse device 1. The actuator 17 moves the connecting element 13 out of its closed position in the gap 26 between the two connection lugs 11, 12 and into the open position outside the connection lugs 11, 12. Due to the elastic expansion of the connecting element 13, it is wider after the movement out of the press fit between the two connection lugs 11, 12 than before. It remains in the cavity 24.

The insulators 16*a*, 16*b* ensure the insulation of the connecting element 13 in the open position from at least one of the two connection lugs 11, 12.

As can be seen in FIG. 1*c*, the housing 10 is preferably arranged tightly around the connecting element 13 and/or at least one of the connection lugs 11, 12. Thus, the drive chamber 23 and the cavity 24 are separated from each other, preferably at least almost airtight, which is particularly advantageous for pyrotechnic and gas-operated actuators 17, as this allows a pressure to build up in the drive chamber 23, which leads to the movement of the connecting element 13.

In the embodiment shown in FIG. 1, it can further be seen that the cross-section of the connecting element 13 is substantially constant along the direction of movement of the actuator 17, spatial direction z. Thus, the connecting element 13 can slide along the connection lugs 11, 12 when moving out of the gap 26.

Figure 2A:
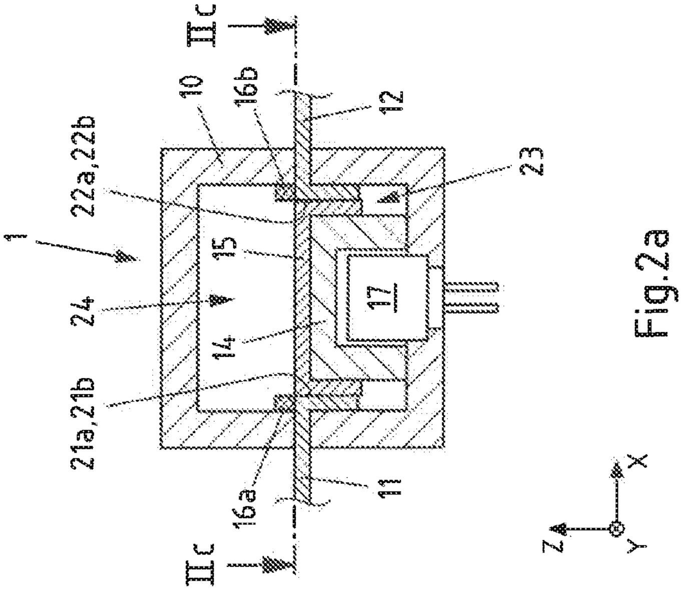
FIG. 2 *a-c* an embodiment of a fuse device with connection lugs and a connecting element made of sheet metal.

FIG. 2 shows an embodiment example with connection lugs 11, 12 made of sheet metal. In this embodiment, the connection lugs are arranged on opposite sides of the housing 10 and have been bent downward to increase the contact surfaces 21*a*, 22*a* (consequently also contact surfaces 21*b*, 22*b*) with the connecting element 13. Furthermore, the connection lugs 11, 12 rest against and are supported by the inner wall of the housing.

The connecting element 13 according to FIG. 2 is also partially formed from a sheet metal piece 15. In addition, the sheet metal piece 15 is arranged on a support element 14. The sheet metal piece (contact piece) 15 serves the purpose of electrically connecting the two connection lugs 11, 12. The sheet metal of the contact piece 15 can be turned over the support element 14, for example, in a U-shaped or pot-shaped manner and wrap around it on three sides.

As shown in FIG. 2, the support element 14 can have a cavity pointing downward toward the actuator. This can absorb forces during pressing of the connecting element 13 and be pressed slightly inwards in the process, so that its width in the x-direction is reduced in the press fit. When the connecting element 13 is released from the gap 26, a further spreading of the contact piece 14 can thus be achieved in comparison with a connecting element 13 and/or support element 14. In this way, the fixation of the connecting element 13 after release from the gap 26 in the upper area 24 is achieved with increased security.

It is also possible for the contact piece 15 to comprise a plurality of electrically conductive flat elements, such as metal sheets or strips, one or more of which are arranged respectively at the contact surfaces 21*b*, 22*b* to the two connection lugs 11, 12 and their contact surfaces 21*a*, 22*a*. The sheets at the contact surfaces 21*b*, 22*b* are in this case still connected by a further conductive element, which may be a sheet, a solid material component and/or a cable or other conductive element.

The support element 14 serves to absorb mechanical pressure generated during the pressing of the connecting element 13. It is located together with the contact piece 15 between the connection lugs 11, 12 and may contact them in addition to the contact piece 15. Preferably, only parts of the contact piece 15 contact the contact surfaces 21*a*, 22*a* of the connection lugs 11, 12 in order to maximize the conductive contact area as much as possible. By combining a support element 14 made of a possibly non-conductive or also conductive material with a conductive contact piece 15 made of several individual parts of sheet metal and/or solid material, the weight and costs are reduced compared to a connecting element 13 made of solid material. The mechanical and electrical functions of the connecting element 13 are separated: the supporting element 14 takes over the mechanical absorption of pressure and the contact piece 15 establishes the electrical connection between the connection lugs 11, 12.

Figure 2B:
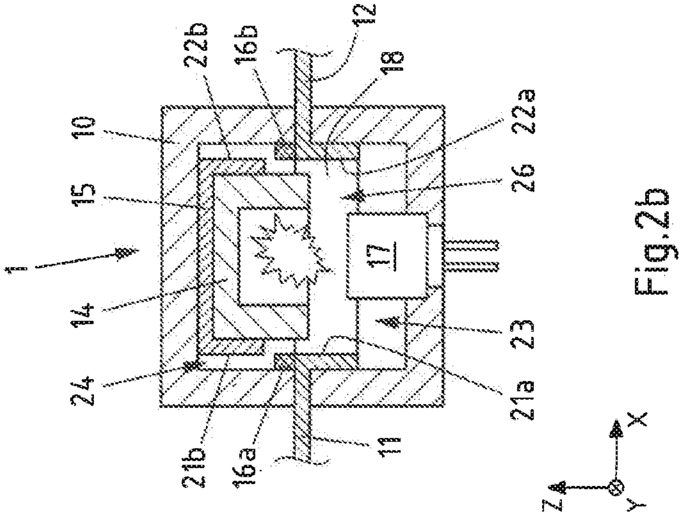

FIG. 2*b* shows the open position of the connecting element 13 and thus the electrical separation of the two connection lugs 11, 12 from each other. Also in this embodiment, the connecting element 13 expands after leaving the gap 26 and cannot slide back into the gap 26. The insulators 16*a*, 16*b* permanently interrupt the electrical contact between at least one connection lug 111, 12 and the connecting element 13. The sheet metal elements in the region of the contact surfaces 21*b*, 22*b* can be dimensioned such that they can slip over the insulators 16*a*, 16*b*, but a downwardly projecting part of the support element 14 remains in the gap 26. In particular, the support element 14 can be dimensioned so that the part projecting downwards over the contact piece 15 fits at least almost exactly into the gap 26 in the open position and the connecting element 13 is thus stabilized in the open position.

Figure 2C:
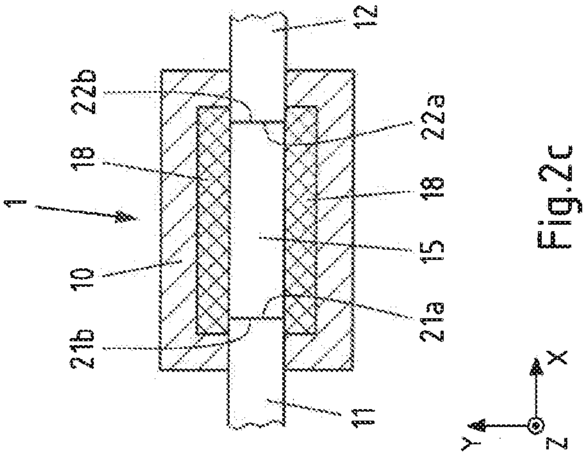

FIG. 2*c* shows a top view of the fuse device 1. A seal 18 is arranged on both sides of the string of connection lugs 11, 12 and connecting element 13. Its purpose is to isolate the two cavities 23 and 24 of the housing 10 from each other and to allow a pressure to be built up in the drive chamber 23 without a relevant amount of gas being able to penetrate from cavity 23 into cavity 24 and the pressure in cavity 23 thus being lost. In particular, the two cavities are separated from each other in a gas-tight manner.

Figures 3A, 3B, 3C:
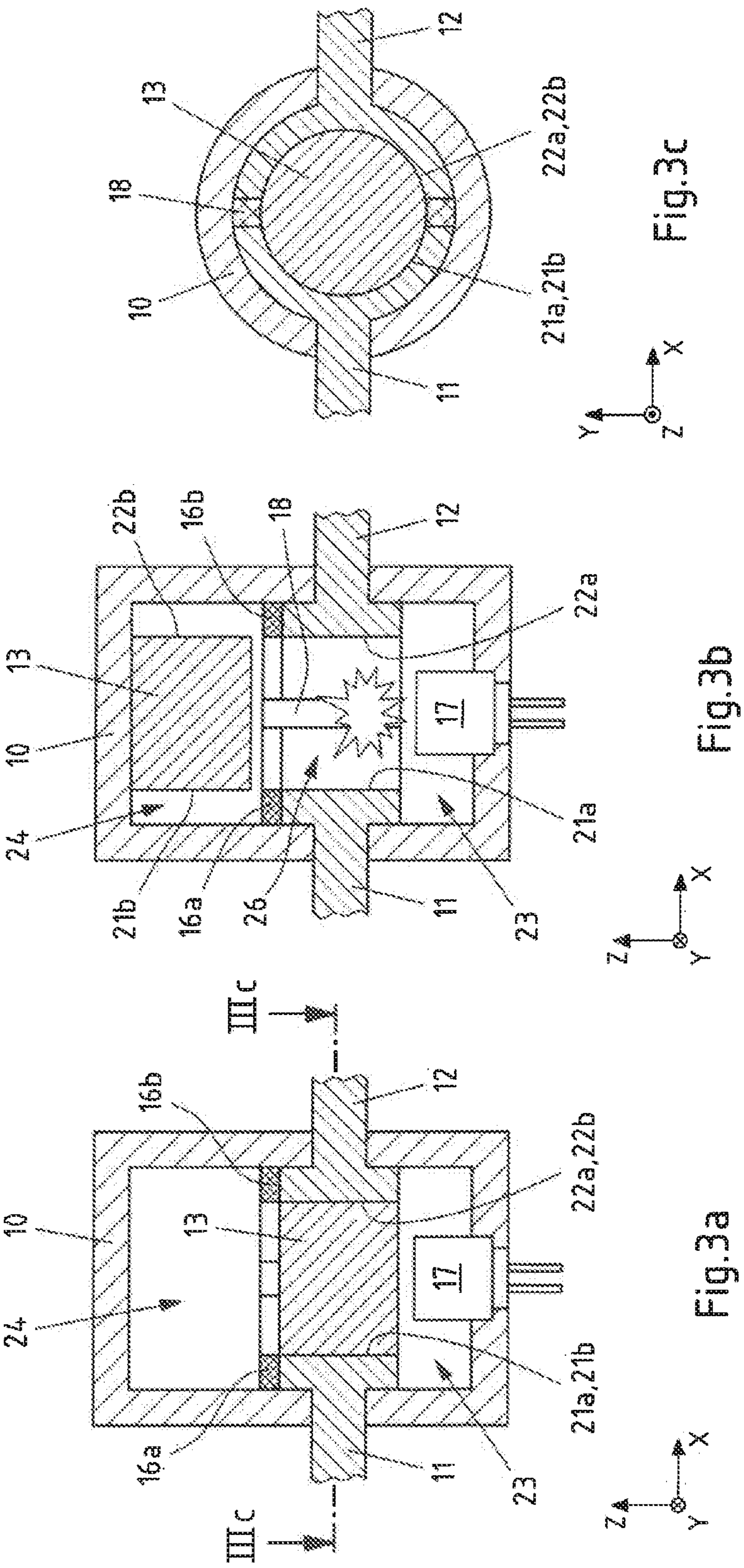
FIG. 3 *a-c* an embodiment of a fuse device according to the subject matter with a cylindrical structure with concave gap surfaces of the connection lugs.

As a further embodiment, an essentially cylindrical structure of the fuse device 1 is shown in FIGS. 3*a-c*. As can be seen in the top view in FIG. 3*c*, the cross-section of the connecting element 13 is round and it is enclosed by the connection lugs 11, 12 in the closed position. For this purpose, the connection lugs 11, 12 are widened in the area of the contact surfaces 21*a*, 22*a*, and in particular their shape is essentially that of half tubes. In this design, the contact area is increased. Also, the connecting element 13 is moved along a channel when moved by the actuator 17, so the connection lugs 11, 12 act as a guide.

In the top view in FIG. 3*c*, it can further be seen how a seal 18 isolates the two cavities 23 and 24 from each other.

Figure 4C:
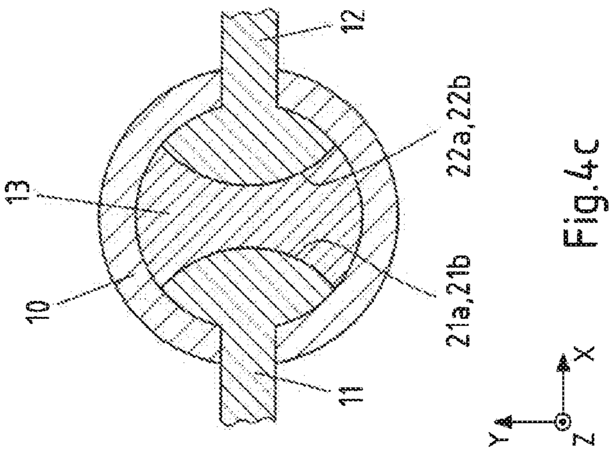
FIG. 4 *a-c* an embodiment of a fuse device according to the subject matter with a cylindrical structure with convex gap surfaces of the connection lugs.
Figure 4B:
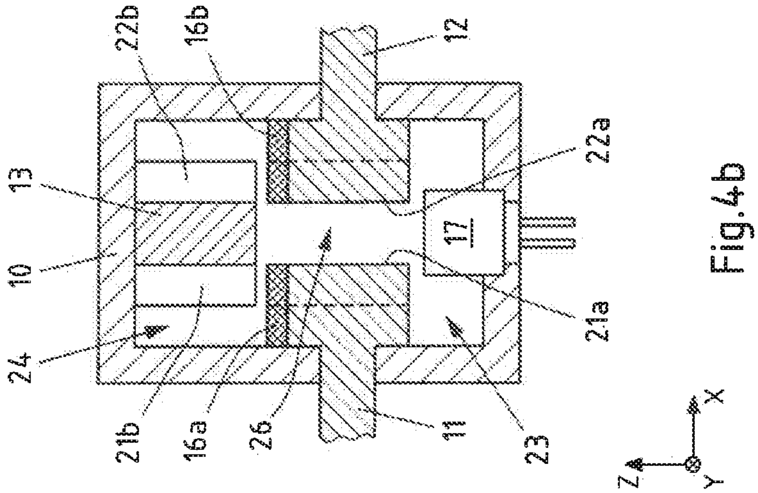
Figure 4A:
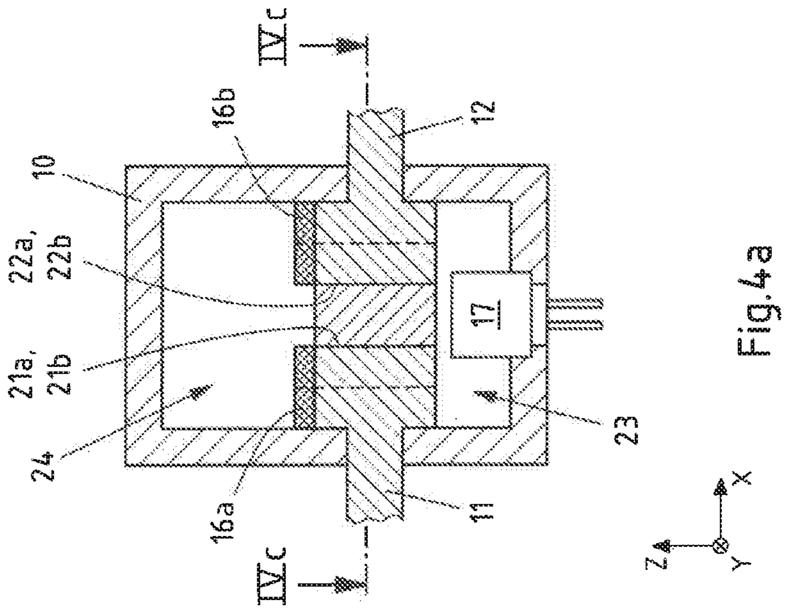

A similar design is disclosed in the embodiment of FIG. 4*a, b*. Instead of the connection lugs 11, 12 engaging around the connecting element 13, the connecting element 13 here has recesses in the region of the contact surfaces 21*b*, 22*b*, in which corresponding convex formations of the connection lugs 11, 12 engage.

FIG. 5 shows an alternative embodiment in which the two connection lugs 11 and 12 are not guided into the housing 10 from opposite sides with their end faces facing each other, but are aligned essentially parallel to each other coming from the same side.

Figures 5A, 5B, 5C:
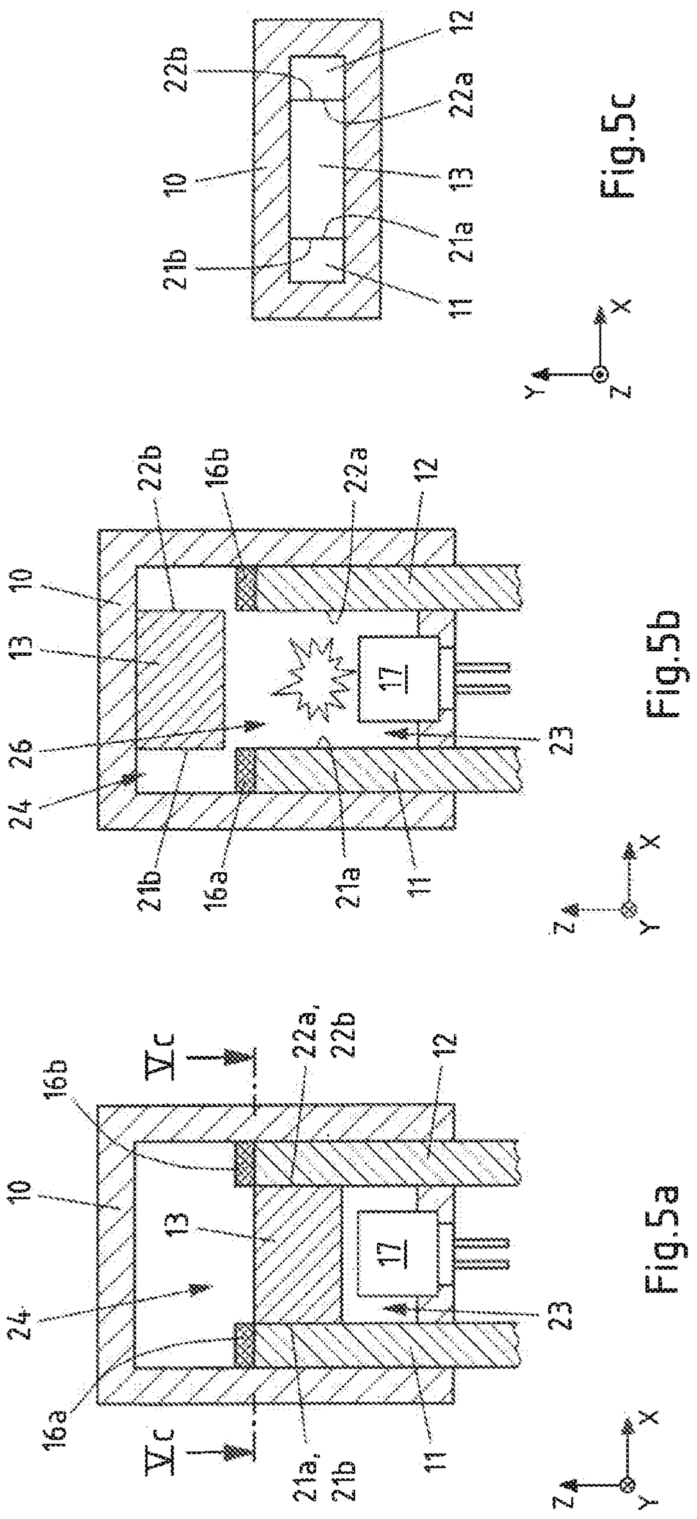
FIG. 5 *a-c* an embodiment of a fuse device according to the subject matter with contacting of the longitudinal surfaces of the connection lugs.

In FIG. 5*c*, it can be seen that the connection lugs 11 and 12 and the connecting element 13 can bear against the inner wall of the housing essentially without any gap, so that the regions 23 and 24 are essentially insulated from one another, in particular insulated in a gas-tight manner. This has a similar effect to the insulation 18 in FIG. 2*c*, for example.

Figure 6C:
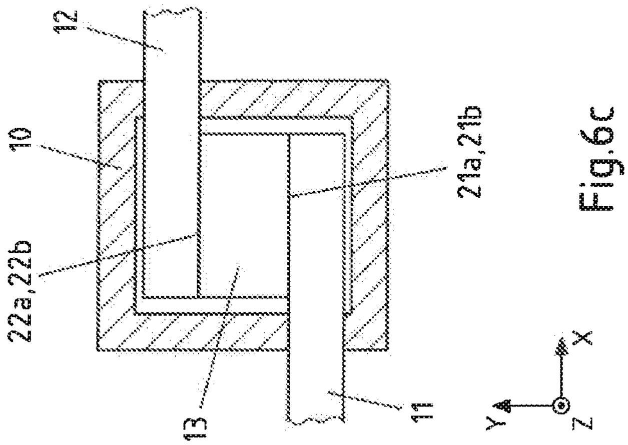
FIG. 6 *a-c* an embodiment of a fuse device according to the subject matter with contacting of the longitudinal surfaces of the connection lugs.
Figure 6B:
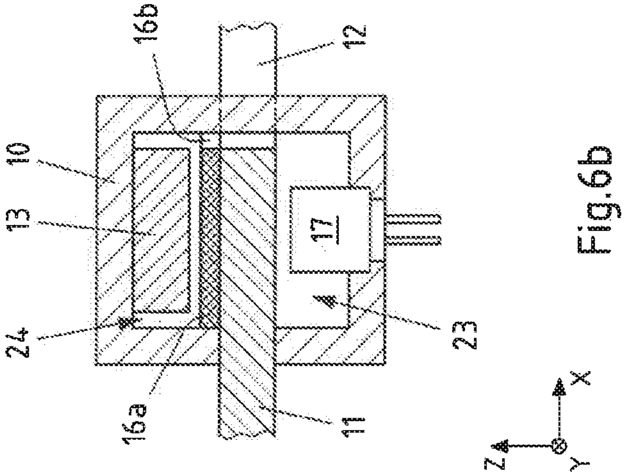
Figure 6A:
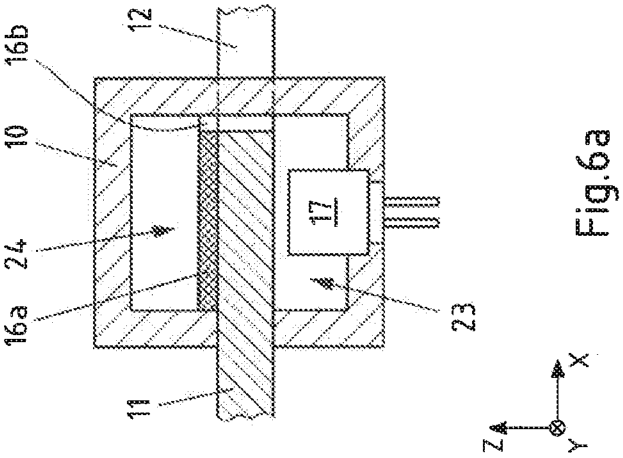

It is also possible that the connection lugs 11, 12 are arranged substantially parallel to each other from opposite sides, see FIGS. 6*a-c*, or that a first connection lug is aligned substantially perpendicular to the second connection lug. In the embodiment shown, the contact surface 21*a*, 22*a* (consequently also contact surfaces 21*b*, 22*b*) between connecting element 13 and connection lug 11, 12 is a longitudinal surface in both connection lugs 11, 12. This may be a narrow or a wide longitudinal surface. By contacting the connection lug 11, 12 and the connecting element 13 at a longitudinal surface, the contact area can be increased compared to contacting at the end surface (see FIG. 1).

In FIGS. 5 and 6, the insulators 16*a*, 16*b* are again arranged on the conductors on the side facing away from the actuator 17, in the embodiment in FIG. 5 on the end faces of the connection lugs 11,'12 and in the embodiment from FIG. 6 on the narrow longitudinal surfaces of the connection lugs 11, 12. The insulators 16 also prevent electrical contact between connection lugs 11, 12 and the connecting element 13 in the open position here.

Figure 7A:
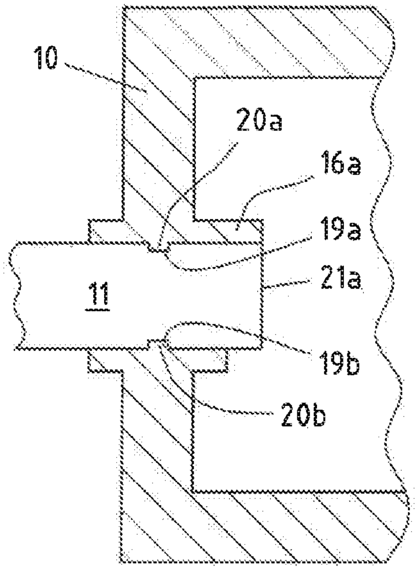
FIG. 7 *a-d* embodiments of the fastening means between the connection lug and the housing of the fuse device according to the subject matter.
Figure 7B:
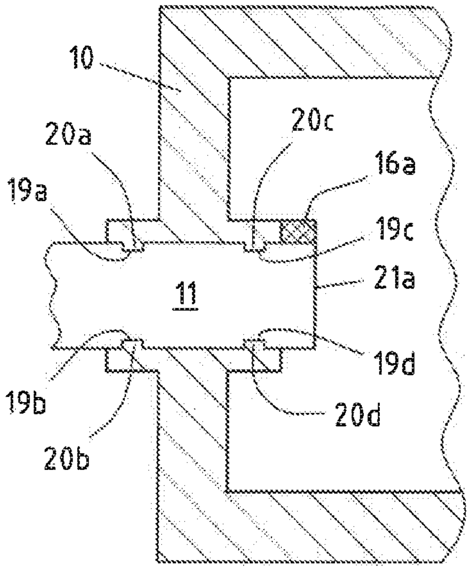
Figure 7C:
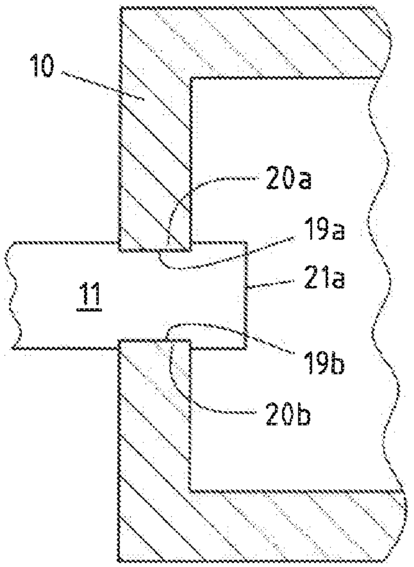

Fasteners may be provided to secure the connection lugs to the housing 10. FIG. 7*a-c* shows some embodiments of such fastening means.

In the embodiment of FIG. 7*a*, projections are provided on the walls of the housing 10 and fastening means 20*a*, 20*b*, in this case projections, are provided on the edges of the recess through which the connection lug is guided, which projections embrace the connection lug 11, 12. An extended projection is provided towards the interior, which extends to the edge of the contact surface 21*b*, 22*b* of the connection lug 11, 12 and can act as an insulator 16. The connection lug 11, 12 has fastening elements 19*a*, 19*b*, in this case recesses. The projections of the housing 10 can engage in these recesses and thus fix the connection lug 11, 12. Fixing the connection lug 11, 12 is particularly important when the connecting element 13 is detached from the gap 26, since this ensures that force is transmitted between the actuator 17 and the connecting element 13. If the connection lugs 11, 12 and the connecting element 13 were able to move jointly, disengagement and thus electrical separation of the connection lugs 11, 12 from each other would not occur.

Similar to FIG. 7*a*, FIG. 7*b* shows fastening means having a plurality of recesses 19 per side in the connection lug 11, 12 in which a plurality of projections 20 of the housing 10 engage. In this embodiment, the insulator 16 is applied to the conductor 11 and is not part of the housing 10. The fact that the fastening means (protrusions) 20 are each attached to protrusions projecting from the housing wall allows them to yield during assembly of the connection lug 11, 12 and facilitates insertion of the connection lug 11, 12.

FIG. 7*c* shows a simpler embodiment in which the entire housing wall engages in a recess 19 in the connection lug.

Figure 7D:
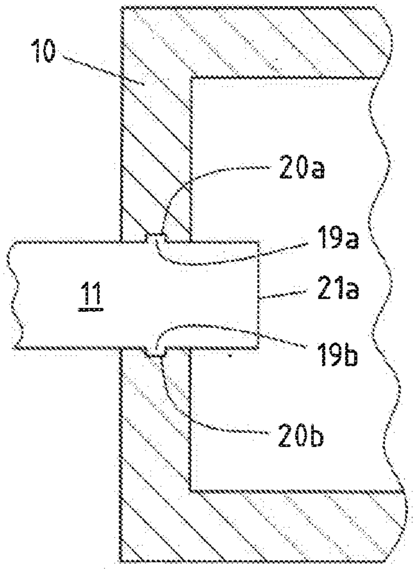

In FIG. 7*d*, an embodiment is given in which the conductor has projections and engages in recesses of the housing 10.

All of the connecting elements of FIGS. 1, and 3-6 may be formed from a solid material or may be formed from a composite of a support element 14 and a contact piece 15, as illustrated in FIGS. 8*a-f.*

Figure 8A:
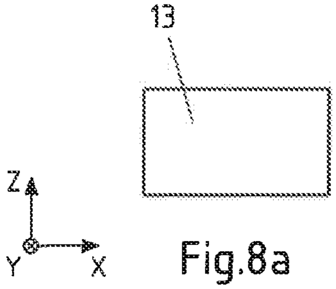
FIG. 8 *a-h* embodiments of the connecting element of the fuse device according to the subject matter.

As shown in FIG. 8*a, b*, the connecting element 13 may be formed of solid material, for example a metal material.

Figure 8C:
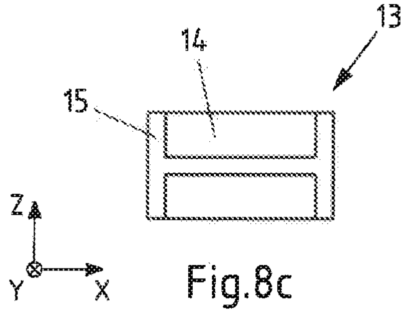
Figure 8B:
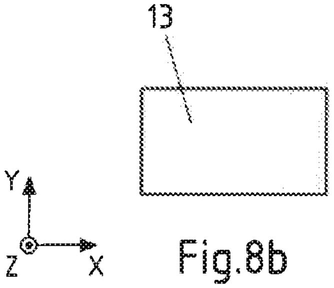
Figure 8D:
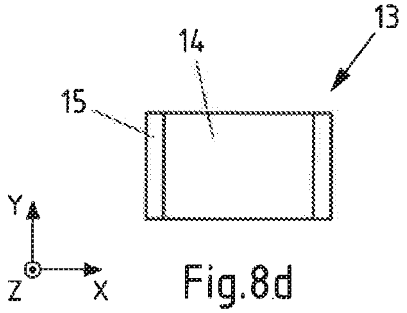

It is also possible for the connecting element 13 to be formed from a support element 14 and a contact piece 15, as shown in FIGS. 8*c-g*. FIGS. 8*c, d* show an H-shaped contact piece 15 made of two flat elements or elements of solid material in the area of the contact surfaces 21*b*, 22*b* and a third contacting element between the flat elements. The contacting element can be a sheet with a surface normal substantially parallel to the spatial direction z or to the spatial direction y or in another spatial direction, or a conductor made of solid material, for example a round conductor or a flat conductor, which is either located in the volume between the contact surfaces 21*a*, 22*a* (consequently also contact surfaces 21*b*, 22*b*) and/or is enclosed by the support element. The support element fills the spaces between the flat elements at the contact surfaces.

Figure 8E:
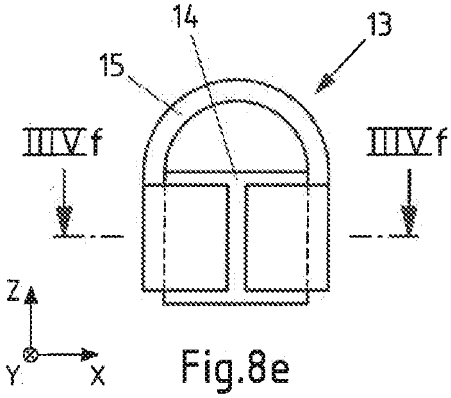
Figure 8G:
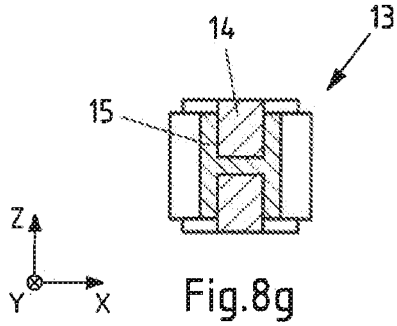

FIGS. 8*e, f* show a cylindrical connecting element comprising contact piece 15 and support element 14, and FIGS. 8*g, h* show a cylindrical connecting element with troughs provided for connection lugs 11, 12, which also comprises support element 14 and contact piece 15. Support element 14 and contact piece 15 can each be composed of several elements.

Figure 8F:
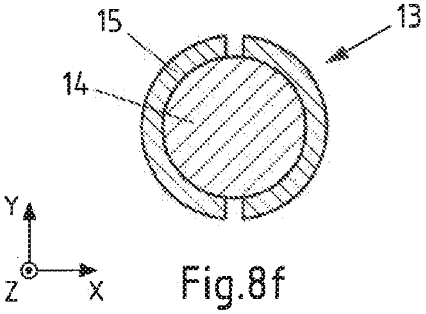
Figure 8H:
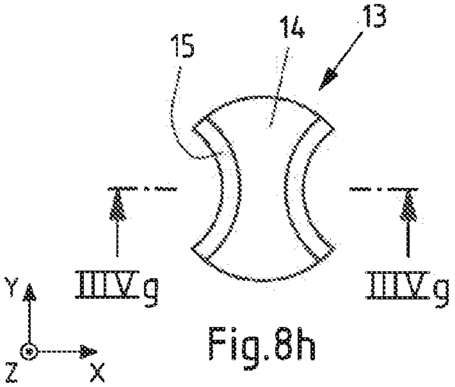

The support element 14 can also project beyond the parts of the contact piece 15 at the contact surfaces 21*b*, 22*b*, see FIG. 8*f* for details, and the contacting element for electrically connecting the contact surfaces 21*b*, 22*b* of the connecting element 13 can also describe any paths outside the volume enclosed by the contact surfaces 21*a*, 22*a*.

FIGS. 9*a-f* show further embodiments of the solution according to the subject-matter, in which the connecting element 13 is tapered in one direction. In particular, the connecting element 13 tapers in a direction substantially antiparallel to the direction of movement of the actuator, here negative spatial direction z, hereinafter taper direction. The connection lugs 11, 12 are substantially shaped so that the connecting element 13 fits precisely into the gap 26 spanned between them.

Figure 9A:
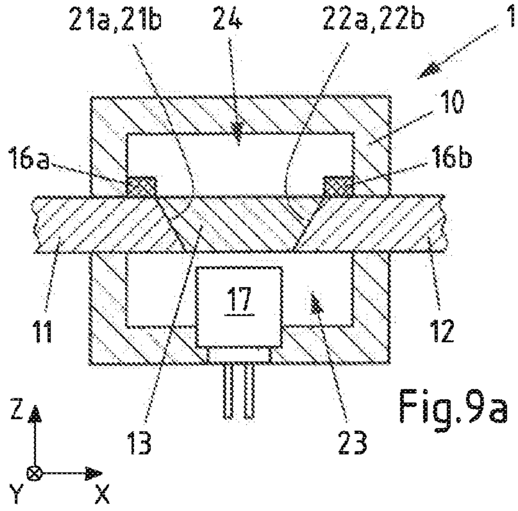
FIG. 9 *a-f* embodiments of tapering connecting elements of the fuse device according to the subject matter.
Figure 9B:
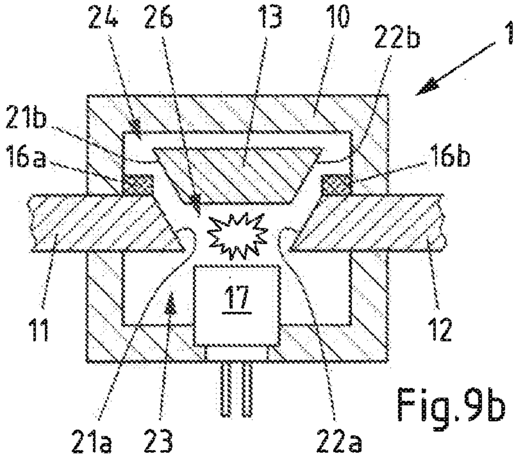
Figure 9C:
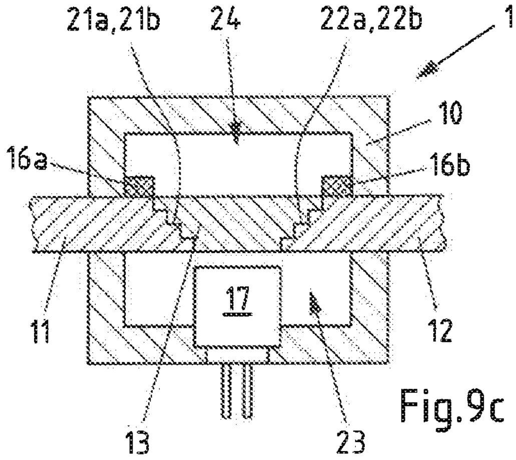
Figure 9D:
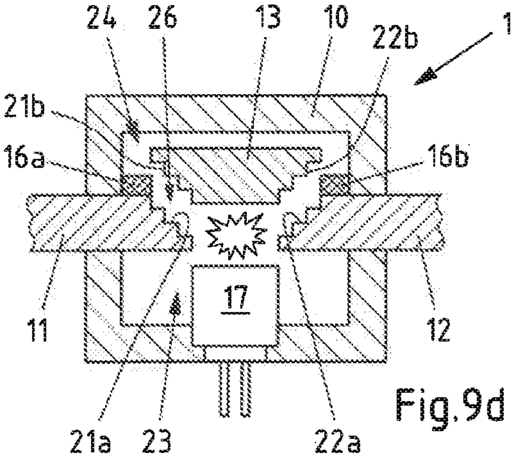

FIG. 9*a, b* shows a substantially tapered design of the connecting element 13 in which the cross-section of the connecting element 13 decreases substantially continuously along the taper direction. Due to the taper, a separation from the connection lugs 11, 12 is already achieved after small distances of movement of the connecting element 13, and no frictional resistance between connection lugs 11, 12 and connecting element 13 has to be overcome over long displacement distances. In particular, it is possible to dimension the cavity 24 and the insulators 16 such that the freedom of movement of the connecting element 13 in the open position is restricted and the latter cannot tilt in the direction of the connection lugs 11, 12.

The cross-sectional area of the connecting element 13 does not need not fall uniformly per length in the taper direction. Thus, FIG. 9*c, d* shows a design of the connecting element 13 of the solution according to the subject matter in which the cross-section is at least almost constant along the taper direction in sections and then decreases again at least almost abruptly. It is advantageous if the cross-sectional area tapers monotonically, i.e. does not substantially increase with the taper direction. Sections with substantially constant cross-sectional area are possible.

Figure 9E:
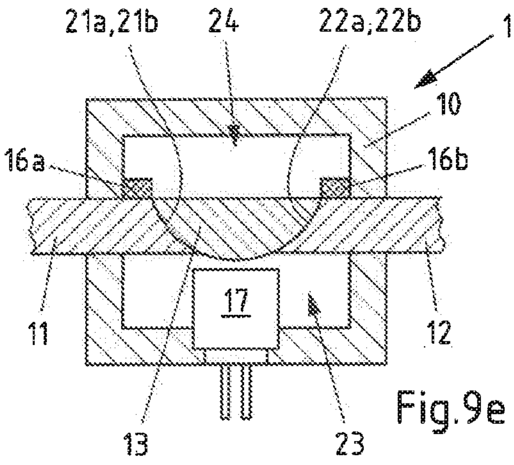
Figure 9F:
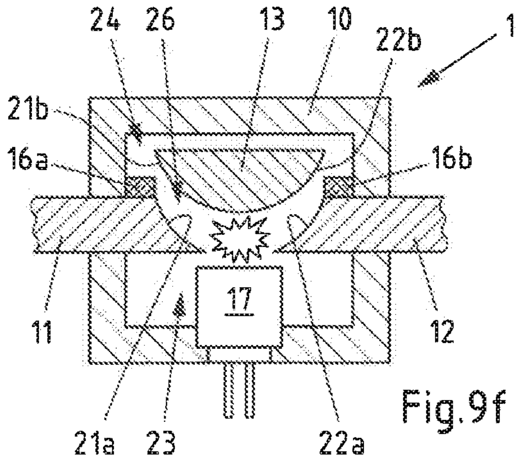

FIGS. 9*e, f* show another embodiment in which the cross-section of the connecting element 13 is substantially semi-circular in the spatial direction y. The connecting element 13 may be formed as a half cylinder, a half sphere, or a similar shape with a semicircular cross-section. Again, the cross-section slopes monotonically, though not continuously, in the direction of taper. The circular cross-sectional shape ensures that the connecting element does not come into contact with either of the connection lugs, even when twisted about the spatial direction y.

FIGS. 10*a-d* show embodiments of the surfaces of connecting element 13 and/or connection lugs 11, 12. Since the electrical contact resistance between connection lugs 11, 12 and connecting element 13 decreases as the contact area increases, it can be advantageous not to keep the contact surfaces 21*a*, 22*a* (consequently also contact surfaces 21*b*, 22*b*) smooth but to structure them in a targeted manner.

Figure 10A:
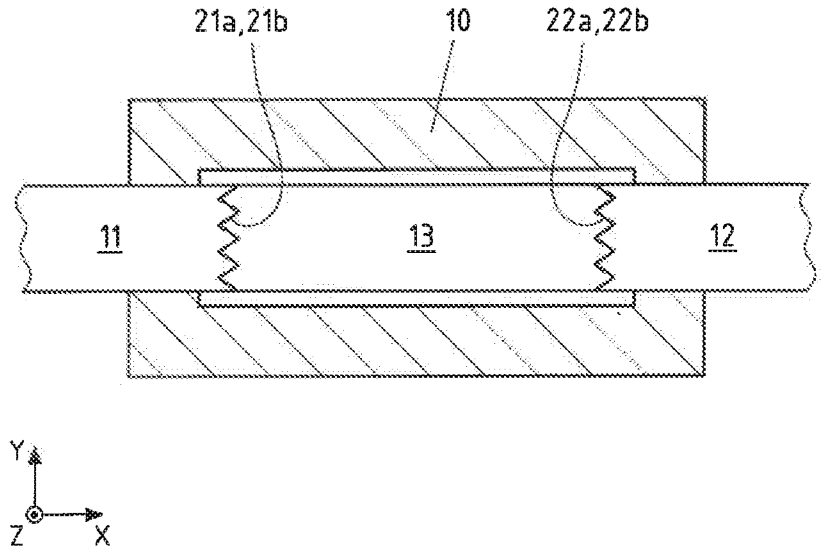
FIG. 10 *a-d* embodiments of the surfaces of the connecting element and connection lugs of the fuse device according to the subject matter.
Figure 10B:
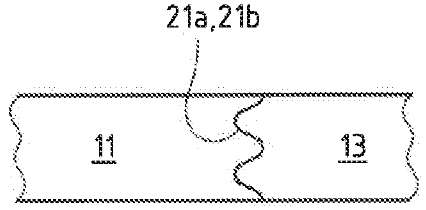
Figure 10C:
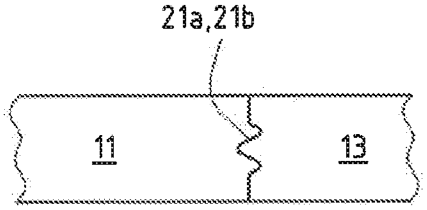

This can be done, for example, as shown in FIG. 10*a*, via a substantially serrated surface structure. The serrations of the connecting element 13 and those of the connection lugs 11, 12 interlock and the contact area is thus increased. The interlocking individual projections and recesses (serrations in FIG. 10*a*) can also be rounded, for example wave-shaped, as shown in FIG. 10*b*. Also, parts of the contact surfaces 21*a*, 22*a* (consequently also contact surfaces 21*b*, 22*b*) may be smooth and other parts may be structured, see FIG. 10*c*. It is advantageous if the cross-section along spatial direction z is further either constant or monotonically tapers in negative z-direction.

Figure 10D:
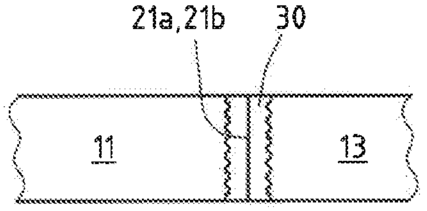

In a further embodiment, FIG. 10*d* shows the at least partial coating of at least one of the contact surfaces 21*a*, 22*a* (consequently also contact surfaces 21*b*, 22*b*) of connecting element 13 and/or connection lugs 11, 12. In particular, it is useful for improving the electrical contact between connecting element 13 and connection lugs 11, 12 if the coating is formed from a softer material than the at least one of the connection lugs 11, 12 and/or the connecting element 13. Thus, when the connecting element 13 and the connection lugs 11, 12 are pressed together, a high contact quality and, if necessary, interlocking of the contact surfaces 21*b*, 22*b* of the connecting element 13 and contact surfaces 21*a*, 22*a* of the connection lugs 11, 12 can be achieved by plastic deformation of the coating.

Figure 11A:
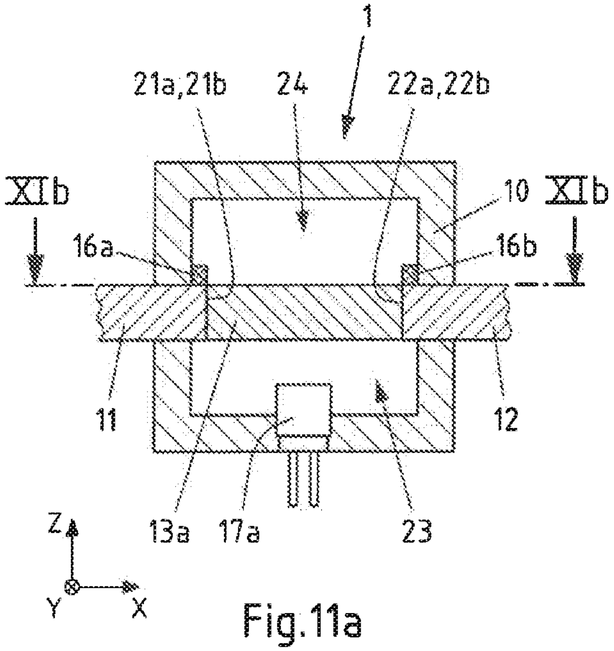
FIG. 11 *a-c* embodiments of the fuse device according to the subject matter with multiple fuse conductors.
Figure 11B:
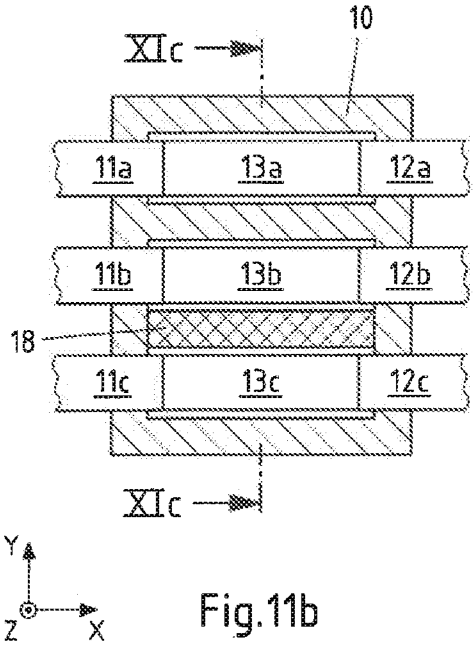

In another embodiment, FIG. 11*a, b* shows a fuse device 1 according to the subject matter with several fuse conductors, each comprising two connection lugs 11, 12 and a connecting element 13. The fuse conductors can be located in a common chamber of the housing, see the insulation conductors of the pairs of connection lugs 11*b*-12*b* and 11*c*-12*c* in FIG. 11*b*.

Here it may be advantageous to arrange a seal 18 between the conductors. All or a subset of the fuse conductors can also be separated from each other by additional housing walls extending between the fuse conductors, see the separated connection lug pair 11*a*-12*a* in FIG. 11*b*.

The connecting elements 13 of the respective fuse conductors can be released together from the respective gaps 26 between the respective connection lugs 11, 12 by a single actuator 17. It is also possible for the connecting elements 13 of the fuse conductors to each be released from the connection lugs 11, 12 by a different actuator 17. It is also possible for subsets of the fuse conductors to be disconnected from respective individual actuators 17 and/or for subsets to be driven together by a common actuator 17.

Figure 11C:
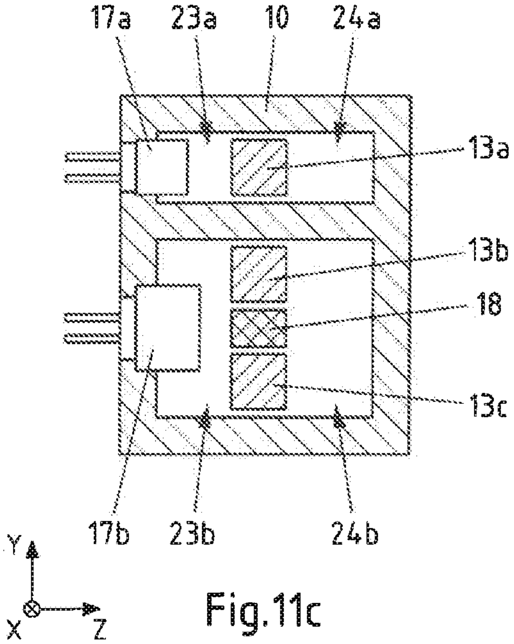

Separation of the housing 10 into a plurality of chambers containing individual ones or more of the fuse conductors, as shown in FIG. 11*c*, has the advantage that a separation operation in a first chamber does not affect the contents of another chamber. For example, the distribution of waste products generated during the separation such as dust, soot, splinters or the like from already separated fuse conductors into the area of other fuse conductors that may still be separated can be prevented.

Figure 12A:
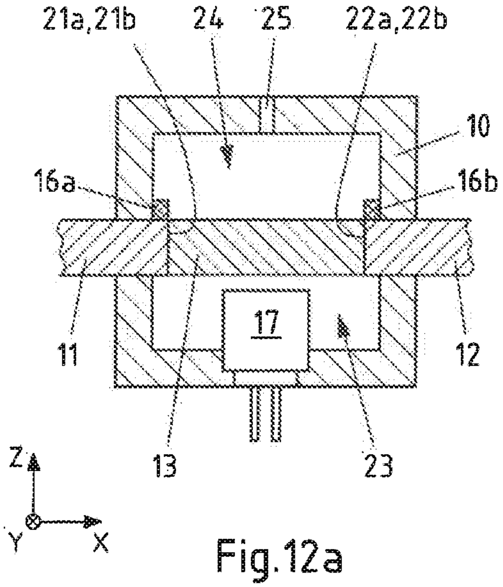
FIG. 12 *a, b* embodiments of the fuse device according to the subject matter with venting means.
Figure 12B:
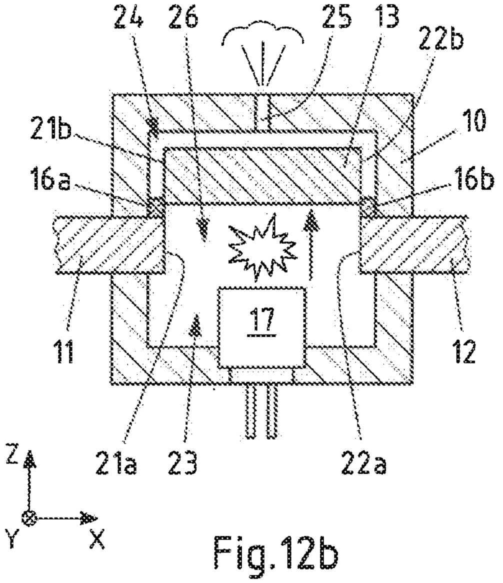

Since gas can accumulate in the cavity 24 when the connecting element is abruptly disconnected from the connection lugs 11, 12 and a pressure can build up which impedes the movement of the connecting element 13, it may be advantageous to provide venting means 25 in this area of the housing 10. As shown in FIG. 12*a, b*, for example, a valve, hole, by breakable seal, or similar device is possible through which gas can escape into the cavity 24 when the fuse device 1 is triggered and the connecting element 13 moves. The venting means may be located on the top wall of the housing 10 as shown in FIG. 12, but may also be located on side surfaces or other surfaces.

Figure 13A:
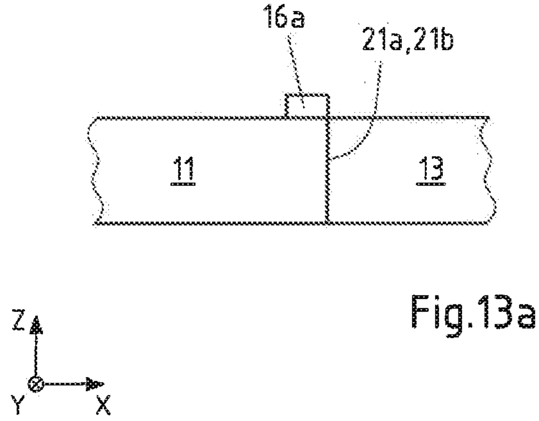
FIG. 13 *a-d* embodiments of the insulators of the fuse device according to the subject matter.
Figure 13B:
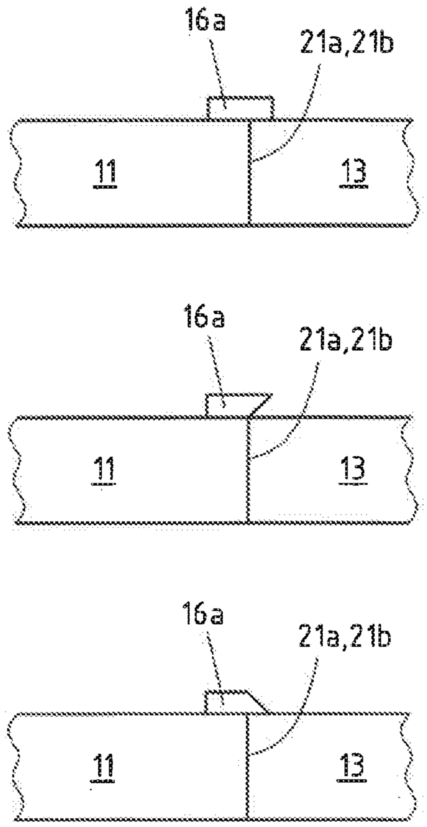

FIGS. 13*a-d* show embodiments of the insulators 16 of the fuse device 1 according to the subject matter. The insulator 16 as shown in FIG. 13*a* is flush with the contact surface 21*a*, 22*a* of the connection lug 11, 12. It can also project beyond the contact surface 21*a*, 22*a* towards the center of the gap as shown in FIG. 13*b*. In FIG. 13*b*, various designs of insulators 16 projecting beyond the contact surface 21*a*, 22*a* are shown, an insulator with a constant cross-section at the top and two tapered designs below. By tapering the insulator 16, increased flexibility can be achieved, and one of the lower two insulators 16 of FIG. 13*b* offers less resistance when the connecting element 13 is detached from the gap 26 than the upper design, in which the insulator's area moment of inertia is higher due to the unchanged cross section.

Figure 13C:
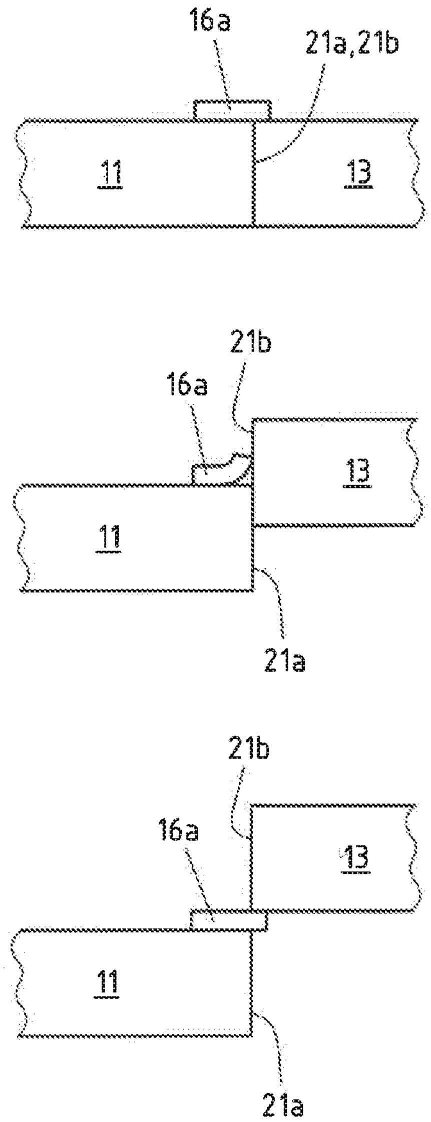

FIG. 13*c* shows the sequence of deformation of an insulator overhanging the contact area 21*a*, 22*a* of the connection lug 11, 12 when the connecting element 13 is separated from the connection lugs 11, 12. The connecting element 13 causes bending of the insulator 16 as it moves out of the gap 26. Once it has passed the insulator 16, the latter, driven by its elasticity, moves back to its original position and prevents the connecting element 13 from sliding back into the gap 26, together with the expansion of the connecting element 13. If the insulator 16 protrudes into the gap 26, it is impossible for the connecting element 13 to slide back into the gap 26, even without expansion of the latter.

In particular, in the embodiment examples FIG. 13 *b*, the insulator 16 may be formed of an elastic non-conductive material such as plastic, rubber, silicone. In FIG. 13*a*, in addition to these materials, a solid material such as glass, ceramic, coated metal, or the like may be used.

Figure 13D:
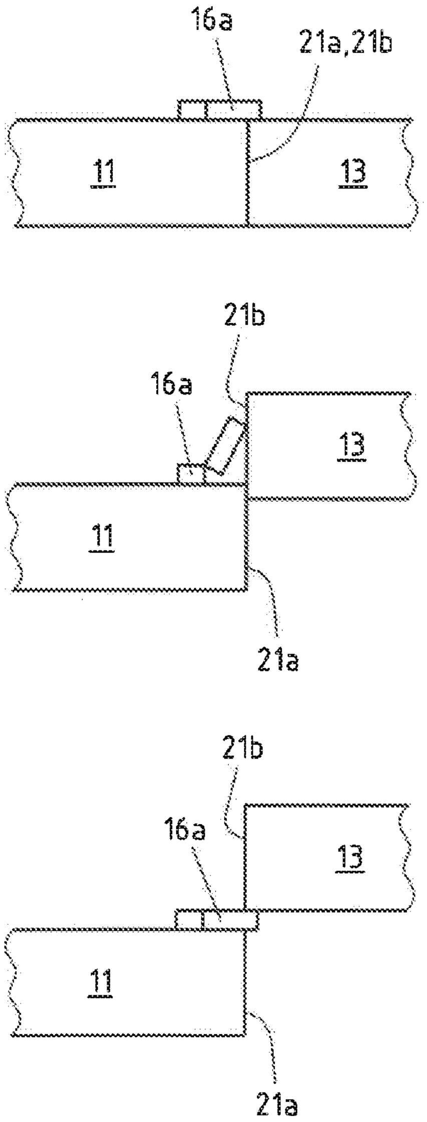

FIG. 13*d* discloses a mechanical snap element that, like the elastic insulator 16 of FIG. 13*c*, is displaced and opened by the connecting element 13 when the connector 13 is moved. After the connecting element 13 has left the gap 26 and left the insulator 16 behind, the latter snaps back into the starting position driven by its mechanical mechanism and blocks the return path of the connecting element 13. The snap element may be formed of elastic non-conductive materials such as plastic, rubber, silicone, etc., but also of non-conductive solids such as glass, ceramic, coated metal, or the like. The elasticity is achieved by a spring mechanism.

What is claimed is:

1. An electrical fuse device for a motor vehicle comprising;

a housing;

a first connection lug routed into the housing;

a second connection lug routed into the housing, wherein the connection lugs are spaced from each other in the housing by a gap, wherein the gap spans between two end faces, respectively at an end of one of the connection lugs, facing one another;

a connecting element electrically connecting the first and the second connection lug in the housing in a closed position, wherein the connection element is in mechanical contact with the first and second connection lugs respectively at a contact surface, wherein the end faces respectively form one of the contact surfaces; and an actuator arranged in the housing, moving the connecting element from the closed position to an open position, wherein in the open position the first connection lug and second connection lug are electrically insulated from one another, wherein the connecting element is arranged in the gap between the two connection lugs and is pressed in an interference fit between the first and the second connection lug, wherein at least one of the connection lugs and/or the connecting element is metallically coated at least in a region of at least one of the contact surfaces and the metallic coating is formed from a softer material than a remainder of the connection lug, and consequently a plastic deformation of the at least one of the contact surfaces takes place when at least one of the connection lugs is pressed to the connecting element.

2. The fuse device according to claim 1, wherein the actuator is a pyrotechnic element or the actuator is an ignition pill.

3. The fuse device according to claim 1, wherein the gap has a constant cross-section along a spatial direction or the gap has a cross-section tapering along a spatial direction.

4. The fuse device according to claim 1, further comprising fastening elements on the housing and/or on the connection lugs in order to fixate the connection lugs.

5. The fuse device according to claim 1, wherein the connection lugs have end faces, the end faces of the connection lugs are arranged facing one another and/or the end faces respectively at least partially form one of the contact surfaces.

6. The fuse device according to claim 1, wherein at least one of the contact surfaces between one of the connection lugs and the connecting element is larger than a cross-sectional surface of one of the connection lugs.

7. The fuse device according to claim 1, wherein the metallic coating has a lower Rockwell hardness than a remainder of the connection lug.

8. The fuse device according to claim 1, wherein at least one of the connection lugs and/or the connecting element is formed from an electrically conductive solid material, or at least one of the connection lugs and/or the connecting element is formed from a metal material, or at least one of the connection lugs and/or the connecting element is formed copper or a copper alloy or from aluminum or an aluminum alloy.

9. The fuse device according to claim 1, wherein at least one of the connection lugs and/or the connecting element is formed as a flat element, or at least one of the connection lugs and/or the connecting element is formed from sheet metal.

10. The fuse device according to claim 1, wherein the connecting element comprises a first conductive element made of an electrically conductive material and a second conductive element made of a second material, the first conductive element being in contact with the first connection lug and the second connection lug in the closed position and both the first and the second conductive element are arranged together between the first connection lug and the second connection lug in the interference fit.

11. The fuse device according to claim 10, wherein the connecting element comprises a flat part which embraces a support element in a U-shaped or pot-shaped manner, or the conductive element comprises a plurality of flat parts which are arranged in a region of the contact surfaces on the support element and a further electrically conductive element which establishes an electrical connection between the flat parts, or the conductive element is an H-element in which two outer surfaces are the contact surfaces and a central strut connects side surfaces, and intermediate spaces are filled by the support element.

12. The fuse device according to claim 1, wherein the connecting element in the open position in a direction of extension of the gap is longer than a width of the gap in the direction of the extension of the gap.

13. The fuse device according to claim 1, further comprising at least one insulator made of electrically non-conductive material arranged in the housing on at least one of the connection lugs on a side facing away from the actuator, which terminates flush with the contact surface and/or projects beyond the contact surface towards a center of the gap.

14. The fuse device according to claim 13, wherein the insulator is formed from an elastic material, or plastic, and/or is formed as snap elements and/or the insulator is part of a conductor insulation and/or the insulator is part of the housing, or the insulator is part of projections on inner walls of the housing.

15. The fuse device according to claim 1, wherein a cavity of the housing, into which the connecting element is moved by the actuator, encloses the connecting element at least in one spatial direction.

16. The fuse device according to claim 1, wherein the connecting element is configured to move along a guide, or the connecting element is configured to move along rails arranged on an inner wall of the housing and/or along rails penetrating the connecting element and/or along the contact surfaces of the connection lugs.

17. The fuse device according to claim 1, wherein a plurality of pairs of connection lugs, each with one of the connecting element, are arranged in the housing and at least one group of the connecting elements is driven by a single actuator from a respective closed to a respective open position and/or the connecting element is driven individually by the actuator from a respective closed to a respective open position.

18. The fuse device according to claim 1, further comprising venting elements in the housing, via which a gas located in the housing escapes when the actuator is triggered and/or seals are provided between the connecting element and/or connection lugs and an inner wall of the housing.

19. A method of manufacturing the fuse device according to claim 1, wherein the connection lugs are mechanically pressed with the connecting element and then installed together with the actuator in the housing and/or the connection lugs and the connecting element are first introduced into the housing and then pressed with the connecting element.

20. A method of manufacturing the fuse device according to claim 19, wherein the connection lugs are pressed together with the connecting element using a hydraulic, hydrostatic, pneumatic and/or motor-driven pressing method.

21. A method of operating the fuse device according to claim 1, wherein the connecting element is moved from the closed to the open position by the actuator, so that the electrical connection of the connection lugs to one another is interrupted.

22. The fuse device according to claim 1, wherein an interlocking of the two contact surfaces takes place when at least one of the connection lugs is pressed to the connecting element.

* * * * *